United States Patent [19]

Lalancette et al.

[11] Patent Number: 4,478,796

[45] Date of Patent: Oct. 23, 1984

[54] PRODUCTION OF MAGNESIUM OXIDE FROM MAGNESIUM SILICATES BY BASIC EXTRACTION OF SILICA

[75] Inventors: Jean M. Lalancette, Sherbrooke; Jean P. Drolet, Neufchatel, both of Canada

[73] Assignee: Societe Nationale de Liamiante, Quebec, Canada

[21] Appl. No.: 467,372

[22] Filed: Feb. 17, 1983

[51] Int. Cl.³ .............................................. C01F 5/00
[52] U.S. Cl. .................................... 423/155; 423/167; 423/332; 423/636
[58] Field of Search ............... 423/332, 158, 167, 155, 423/636

[56] References Cited

U.S. PATENT DOCUMENTS

| | | | |
|---|---|---|---|
| 1,388,285 | 8/1921 | Moore | 423/158 |
| 2,243,044 | 5/1941 | Westby | 423/158 |
| 2,549,798 | 4/1951 | Gee et al. | 423/158 |
| 2,783,129 | 2/1957 | Baral | 423/332 |
| 2,988,423 | 6/1961 | McDaniel | 423/332 |
| 3,203,755 | 8/1965 | Rathmell | 423/332 |
| 3,346,335 | 10/1967 | Schnürch et al. | 423/332 |
| 4,029,736 | 6/1977 | Melkonian | |

FOREIGN PATENT DOCUMENTS

| | | | |
|---|---|---|---|
| 0723548 | 12/1965 | Canada | 423/332 |
| 3012073 | 10/1981 | Fed. Rep. of Germany | 423/332 |
| 42-12057 | 7/1967 | Japan | 423/158 |
| 24237 | of 1903 | United Kingdom | 423/332 |
| 586123 | 12/1977 | U.S.S.R. | 423/332 |
| 903296 | 2/1982 | U.S.S.R. | 423/332 |

Primary Examiner—John Doll
Assistant Examiner—Wayne A. Langel
Attorney, Agent, or Firm—Cushman, Darby & Cushman

[57] ABSTRACT

There is provided a process for replacing the magnesium oxide portion of a nature magnesium silicate with sodium oxide thereby to form sodium silicate which comprises melting a natural magnesium silicate and sodium carbonate at a temperature of from 1100° to 1350° C. until a clear melt is obtained, the molar ratio of sodium oxide derived from the sodium carbonate per mole of silica contained in the natural magnesium silicate being from 4:1 to 7:1, quenching and extracting said clear melt with water and separating the insoluble magnesium oxide from the solution containing predominantly sodium silicate and sodium hydroxide.

6 Claims, No Drawings

PRODUCTION OF MAGNESIUM OXIDE FROM MAGNESIUM SILICATES BY BASIC EXTRACTION OF SILICA

BACKGROUND OF THE INVENTION

One manner of recovering valuable magnesium products from natural magnesium silicates involves a treatment and extraction procedure whereby the magnesium product is recovered as a soluble magnesium salt which is separated from an insoluble silica residue. Such a procedure involves an acid treatment of the natural magnesium silicate. As an example there may be mentioned the use of ammonium sulfate in U.S. Pat. No. 4,277,449, sulfuric acid in U.S. Pat. No. 2,402,370, ammonium bisulfate in U.S. Pat. No. 3,338,667, sulfur dioxide in U.S. Pat. No. 1,865,224, hydrochloric acid Can. Pat. No. 1,034,385 and carbonic acid U.S. Pat. No. 4,058,587.

It is believed that a second approach might involve a procedure whereby the magnesium product would be recovered as an insoluble product while the silica would be recovered in the form of a soluble product which is the opposite of what has been done in the prior art.

Silica is an acidic substance, therefore, the leaching agent has to be basic. Using such a basic agent such as sodium oxide or potassium oxide or precursor of such oxide such as sodium or potassium carbonate would, in principle, leave all of the impurities carried by the starting silicate as contaminants in the magnesium oxide, since these impurities, mainly oxides of transition metals will not dissolve in a basic phase. Therefore, at first glance, the extraction of silica to recover undissolved MgO is not very attractive.

On the other hand treatment of silica with a base is a well known industrial process. For example sand ($SiO_2$) may be melted with sodium oxide or a source of sodium oxide such as salt cake (sodium sulfate) or soda ash (sodium carbonate) to produce a variety of products designated as sodium silicate having a range of composition from $Na_2O.SiO_2$ to $Na_2O.4SiO_2$. The resulting molten product, upon dissolution in water, provides a silicate of soda solution, also known as water glass, which is widely consumed as an adhesive paper in the manufacture of corrugated-paper boxes and in Portland cement products.

SUMMARY OF THE INVENTION

In accordance with the present invention there is provided a process for treating natural magnesium silicates represented by the general formula $xMgO.ySiO_2.zH_2O$ wherein the Mg content varies from about 10 to about 35% and whereby the magnesium oxide portion of the strong $MgO/SiO_2$ bond is replaced with sodium oxide thereby producing a sodium silicate represented by the general formula $4Na_2O.2SiO_2$. The natural magnesium silicate is reacted with a variable amount of sodium oxide in excess of the portion of sodium oxide combined with the silica. The sodium silicate produced by the present invention is readily soluble in water to give what is known as water glass. On the other hand the magnesium oxide displaced fraction will be recovered as an insoluble fraction containing the other metal impurities initially present in the natural silicate.

Accordingly, the process of the present invention comprises melting a mixture of finely divided a natural magnesium silicate and sodium carbonate, preferably, under slightly reducing conditions whereby a clear melt is obtained which upon quenching and dissolving with water provides a solution of sodium silicate and sodium hydroxide which is recovered after separation from the insoluble fraction comprising predominantly magnesium oxide.

DETAILED DESCRIPTION

More specifically the process of the present invention comprises melting a mixture of one mole of finely divided natural magnesium silicate, for example with 4 to 7 moles of sodium carbonate, which provides sodium oxide 'in situ', per mole of silica in the natural magnesium silicate, for example, asbestos tailings whereby the magnesium oxide is displaced in favor of the sodium oxide to form sodium silicate which upon quenching and dissolving with water provides a water-soluble solution of sodium silicate also known as water glass, excess sodium oxide in the form of sodium hydroxide and an insoluble fraction containing magnesium oxide and a major portion of the original metal impurities contained in the starting natural magnesium silicate.

The melting step is carried out at a temperature of from at least 1100° C. to no more than 1350° C. It has been found that below 1100° C., independently of the molar ratio of the reactants, the reaction mixture does not provide a clear melt and therefore the reaction is incomplete. On the other hand, at temperatures above 1350° C., it is found that substantial amounts of sodium oxide formed 'in situ' will distill off and thus will be lost also causing the reaction to be incomplete. Accordingly, it has been found that the range for carrying out the melting step is from 1100° C. to 1350° C. whereby a very fluid melt is obtained and the losses of sodium are at a minimum while providing no secondary reaction between the components of the system.

As far as the molar ratio of the components is concerned, it has been found that there can be used a ratio of 2 to 12 moles of sodium carbonate per mole of natural magnesium silicate providing a $Na_2O:SiO_2$ ratio of 4:1 to 7:1 with a ratio of about 4:1 to about 6:1 being preferred. At the lower ratios of 2:1 such as those used in the sodium silicate industry, the yield of extracted silica is very low, in the order of about 30%. On the other hand with the larger ratios such as 6:1 yields as high as 95% can be readily obtained.

It is surprising that unexpected high yields are obtained only when using from 4 to 7 moles of sodium oxide per mole of silica since in the prior art when using pure silica rather than magnesium silicate or a starting material with up to 4 moles of sodium oxide per mole of silica there was provided readily a type of water glass totally different than the ones in the present invention was obtained. This fact will be readily observed from Table I showing the various products obtained with various ratios of sodium oxide and silica as currently practised in the sodium silicate industry.

TABLE I

| MOLAR RATIO $Na_2O/SiO_2$ IN CURRENT COMMERCIAL SODIUM SILICATES | | |
|---|---|---|
| $2Na_2O.SiO_2$ | (2/1) | Orthosilicate |
| $3Na_2O.2SiO_2$ | (3/2) | Sesquisilicate |
| $Na_2O.SiO_2$ | (1/1) | Metasilicate |
| $Na_2O.2SiO_2$ | (1/2) | Disilicate |
| $Na_2O.4SiO_2$ | (1/4) | Neutral Silicate |

A technical grade magnesium oxide normally accepted on the market is one having a purity of at least 90%. On the other hand though a high percentage of the silica is extracted by the process of the present invention the magnesium oxide fraction does not measure up to the degree of purity required for technical grade magnesium. It is found that the important impurity found in the insoluble magnesium oxide fraction is attributable mainly to the presence of iron oxides present in various proportions in the starting natural magnesium silicates. For example, when starting with asbestos tailings or residues the iron oxide content, expressed as $Fe_2O_3$, various from about 7 to about 9% depending on the origin of the asbestos tailings. Another source of impurities in the magnesium oxide fraction is the presence of oxides of some of the metals of group V, VI, VII and VIII, such as nickel, cobalt and chromium.

As far as the iron oxide is concerned its initial content in the starting natural magnesium silicates can be reduced to a level of less than about 4% by subjecting the starting magnesium silicate to a demagnetization step by any of such procedures which are well known in the art. The remaining iron oxide and other metallic oxides can be caused to be readily removed from the insoluble magnesium oxide fraction by carrying out the melting step of the magnesium silicate and sodium carbonate under slightly reducing conditions. As reducing agents there can be used those known in the chemical field as specific reducers of the oxides of metals of groups V, VI, VII and VIII, for example, a gas such as carbon monoxide, carbon dioxide in the presence of carbon at high temperature, carbon, and other known reducers such as ferrosilicon. The different metals thus liberated are collected at the bottom of the crucible in which the reaction of the present invention is carried and can be tapped out or poured out as desired. It has also been observed that by carrying out the process of the present invention under slightly reducing conditions the oxides of iron and those of the transition metals present in the starting magnesium silicate can readily be achieved without substantial reduction of the magnesium oxide.

Finally, the molten slag of sodium silicate, excess sodium oxide and suspended magnesium oxide substantially devoid of metallic oxide and transition metals is poured into water which dissolves the excess sodium oxide and sodium silicate from which the insoluble magnesium oxide can be filtered out. The solution of sodium silicate and sodium hydroxide, the latter formed by the hydrolysis of the excess sodium oxide, can be used as such or can be concentrated by evaporation. Amongst it many uses, there may be mentioned its use as a basic reagent in industries such as paper making and the like.

The natural magnesium silicates suitable for the purposes of the present invention are those having a magnesium content of from 10 to 35% by weight. As an example there may be mentioned those listed in Table II with the magnesium content.

If it is desired to transform the process into a closed-loop process, the solution of sodium silicate and sodium hydroxide can be treated with carbon dioxide to precipitate silica and to give a solution of sodium carbonate as described in the chemical litterature. By evaporation, the dry sodium carbonate can be recycled in the process of the present invention. It is to be noted that the silica thus obtained can be of very high purity and of large specific area.

TABLE II

| NATURAL MAGNESIUM SILICATES | | |
|---|---|---|
| Name | Formula | % Mg |
| Serpentine | $Mg_6(Si_4O_{10})(OH)_8$ | 26 |
| Talc | $Mg_3(Si_4O_{10})(OH)_2$ | 19 |
| Phlogopite | $KMg_3(AlSi_3O_{10})(OH)_2$ | 17 |
| Biotite | $K(Mg,Fe)_3(AlSi_3O_{10})(OH)_2$ | 13 |
| Chrysolite (olivine) | $(Mg,Fe)_2SiO_4$ | 23 |
| Pyrope (garnet) | $Mg_3Al_2(SiO_4)_3$ | 15 |
| Enstatite (pyroxene) | $Mg_2(Si_2O_6)$ | 24 |
| Diopside | $CaMg(Si_2)_6$ | 11 |
| Chlorite | $Mg_3(Si_4O_{10})(OH)_2Mg_3(OH)_6$ | 32 |
| Tremolite | $Ca_2Mg_5(Si_8O_{22})(OH)_2$ | 15 |
| Anthophyllite | $(Mg,Fe)_7(Si_8O_{22})(OH)_2$ | 20 |

In the case of serpentine, large amounts of the incorporated fibrous chrysotile ($3MgO.2SiO_2.2H_2O$) are mined for the obtention of the fibrous material, asbestos. Also, the amphibole variety of silicates have led to the extraction of fibers mainly of crodicolite and amosite ($5.5FeO, 1.5MgO, 8SiO_2.H_2O$) varieties.

In most if not all of the mineral operations where the above silicates are involved, large amounts of rocks rich in magnesium have to be crushed in order to obtain the desired product, such as asbestos fiber, talc or simply aggregate for concrete. For example, in the case of chrysotile asbestos, the annual production of this material in Canada is of the order of 1.5 million tons per year. Since the fiber represents about 5% of the weight of the rocks involved in the extraction, the total mass of mineral which is grounded in the course of the extraction is in the range of 30 million tons per year. The granulometry of the waste rocks or tailings, varies greatly but a significant portion, between one and five percent, is already very finely grounded. These natural minerals have variable composition depending on the region where they are mined. For example a typical asbestos tailing on the average contains about 40% MgO, 40% $SiO_2$, 0.2% Ni, 0.2 Cr, 7-9% iron expressed as $Fe_2O_3$, 13% water and other minor components.

The granulometry of the natural magnesium silicate is that which is compatible with the melting art in an arc furnace, that is, coarse rather than fine.

When it is desired to start off with a demagnetized fraction of any natural magnesium silicate the demagnetizing step is carried out in accordance with well known procedures in the art. For example the demagnetization step is carried out under dry conditions by passing the granular natural magnesium silicate such as chrysotile asbestos tailings over an electromagnet wherety a major portion of the iron oxide in the mineral is retained by the magnet. A suitable demagnetizing apparatus is one known as a Morstell ® apparatus distributed in Canada by Sala Machine Works of Mississauga, Ontario. By this demagnetization step the initial iron oxide content of about 7 to 9% expressed as $Fe_2O_3$ may be reduced to as low as 2.5% so that a purer magnesium oxide is obtained when exercising the invention in the absence of a reducing agent.

The present invention will be more readily understood by referring to the following Examples which are given to illustrate the exercise of the invention, and constitute the best mode of practising same.

EXAMPLES 1-6

In a typical experiment, a mixture of 18 g of asbestos tailings, −28 mesh non-calcined and non-demagnetized, is prepared with 82 g of $Na_2CO_3$. This represents a 6 to 1 molar ratio of Na₂O to SiO₂, taking the actual composition of the tailings into account. The mixture is placed in a 150 ml crucible of sintered alumina and heated to 900° C. for one hour in a gas fired furnace in a neutral atmosphere. This firing allows the carbonate to decompose to Na₂O in a controlled way. Then, the temperature is raised to 1250° C. for four hours. The fluid hot mixture is then poured rapidly into water. The quenched glass is broken up to −60 mesh and submitted to hydrolysis in an autoclave. The autoclave is operated at 100 psi, 125° C. for 30 minutes, 5 g of the fritted material being treated with 100 g of water in a Teflon ® beaker. The suspension is filtered and the soluble silica is determined by analysis to give the percentage of extraction of silica. Results are reported in Table III.

The experiment was repeated using molar ratios of 1:1 to 5:1 and the results are also reported in Table III.

TABLE III
PERCENTAGE OF WATER SOLUBLE
SODIUM SILICATE AGAINST MOLAR RATIO
OF Na₂O to SiO₂
IN THE REACTION $$3MgO.2SiO_2.2H_2O + XNa_2CO_3 \xrightarrow{1250° C.} 3MgO + 2H_2O + 4Na_2O.2SiO_2 + XCO_2 + (X - 4)Na_2O$$

| Ex. | Value of X (mole) Na₂CO₃ | Ratio Na₂O/SiO₂ | Yield of soluble SiO₂ (% of available SiO₂) dissolved |
|---|---|---|---|
| 1 | 2 | 1/1 | 6 |
| 2 | 4 | 2/1 | 31 |
| 3 | 6 | 3/1 | 38 |
| 4 | 8 | 4/1 | 56.9 |
| 5 | 10 | 5/1 | 76.9 |
| 6 | 12 | 6/1 | 94.5 |

EXAMPLE 7

In one experiment performed as above, carbon (5 g) was mixed with the charge as reducer. It was then noted after melting at 1250° C. for four hours that metallic granules deposed at the bottom of the crucible. The chemical analysis of these metallic granules was the following: 91.3% Fe, 1.68% Ni, C present but not determined quantitatively. The experiment was repeated and the analysis of the metallic granules gave: 90.27% Fe, 1.65% Ni, 0.099% Co, again with the presence of carbon.

Similar results are obtained when the carbon is replaced with ferrosilicon or carbon monoxide.

EXAMPLE 8

Basic Extraction of Silica

1. Summary of the process

In order to extract the silica from the asbestos tailings, the starting material is submitted to a thermal treatment in the presence of sodium carbonate (soda ash) Na₂CO₃ in an arc furnace powered by a 50 KW alternative current generator. The arc furnace is made of a graphite crucible (diameter 12″, depth 18″) which acts as an electrode and an other graphite electrode (diameter 4″) which is immersed in the load to be fused. A 25 to 30 volt alternative current under 800 amperes is applied to the furnace until the complete fusion of the charge, after two hours. During this thermal treatment, the following reaction takes place:

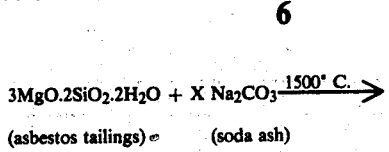

$$3MgO.2SiO_2.2H_2O + X Na_2CO_3 \xrightarrow{1500° C.}$$
(asbestos tailings)   (soda ash)

$$3MgO + 2H_2O + 4Na_2SiO_3 + XCO_2 + (X - 4)Na_2O$$
(sodium silicate)

The reducing atmosphere inside the crucible during the process will favor the reduction of the different heavy metals present in the tailings and the following reactions can be assumed to take place:

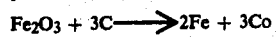

$$Fe_2O_3 + 3C \longrightarrow 2Fe + 3CO$$
Ferric oxide     Metallic iron

$$Fe_3O_4 + 4C \longrightarrow 3Fe + 4CO$$
Ferric oxide     Metallic iron

$$Fe(CrO_2)_2 + 4C \longrightarrow Fe\ 2Cr + 4CO$$
Iron chronite     Ferrochrome

$$Co_2O_3 + 3C \longrightarrow 2Co + 3Co$$
Cobalt oxide     Metallic Cobalt

$$NiO + 2C \longrightarrow Ni + 2CO$$
Nickel oxide     Metallic nickel

In the case of the MgO, the oxide is reduced, but under the conditions prevailing in the crucible, temperature above 600° C., the metal is reoxidized immediately when in contact with CO, and falls back in the load. Therefore, it can be assumed that there is no "metallic magnesium present in the fused load".

After the complete fusion of the load, it is cooled in the crucible under nitrogen atmosphere and a solid glass (3Mg₂Na₂SiO₅) is then recuperated with a metallic lump which stands at the bottom of the crucible just under the vertical electrode. The chemical analysis of this metallic button is:

Fe→94.1%

Ni→4.1%

Cr→0.4%

Co→0.2% others→1.2%

2. Treatment of the fused load

The fused load, in some instances, is poured in water from the crucible, in order to leach out soluble material as described below.

A total load of 29,759 lb is prepared with the following formula:

| | |
|---|---|
| asbestos tailings −28 mesh (595 microns) | 9,579 lb |
| activated carbon | 1,100 lb |
| Soda Ash (Na₂CO₃) | 19,080 lb |

| | TOTAL | 29,759 lb |
|---|---|---|

All the ingredients are then pelletized and dried in an oven at 110° C. for 24 hours.

After drying, the pellets are introduced in the graphite crucible around the vertical graphite electrode and an alternative current of 28 Volts under 800 amperes is applied to the arc furnace. After a two hour period, the load is totally melted. The chemical analysis of the melt is:

| $SiO_2$ | 16% |
|---|---|
| MgO | 15% |
| $Na_2O$ | 41% |

A small quantity of fused glass is poured in a preweighed quantity of water and the rest of the load is cooled in the crucible under nitrogen atmosphere.

3. Treatment of the sample fused glass poured in water

When the fused glass is directly poured in cold water, the material breaks up immediately into a fine powder. The mixture of water and powder is then boiled for two hours and filtered immediately. The filtrate obtained is a solution of sodium silicate and sodium hydroxide in water.

The insoluble fraction is magnesium oxide contaminated with non reacted starting material.

The chemical analysis of the solution and the solid were the following:

Liquid solution: 95% of the starting silica from the residue was found solubilized in the solution.

Solid:
  95% MgO
  4% $SiO_2$
  1% others (traces of metallic oxides)

Besides those insoluble material, there was found some sodium oxide (5 to 15%) depending on the quality of the leaching.

We claim:

1. A process for replacing the magnesium oxide portion of natural magnesium silicate with sodium oxide thereby to form sodium silicate having a ratio of $Na_2O$:$SiO_2$ of from 4:1 to 7:1, which comprises melting a natural magnesium silicate and sodium carbonate at a temperature of from 1100° to 1350° C. until a clear melt is obtained, the molar ratio of sodium carbonate to the natural magnesium silicate being from 8:1 to 12:1, quenching and extracting said clear melt with water and separating the insoluble magnesium oxide from the aqueous solution containing predominantly water-soluble sodium silicate and sodium hydroxide.

2. The process of claim 1, wherein the melting step is carried out in the presence of a reducing agent whereby the metallic oxides of groups V, VI, VII and VIII are reduced to their metal state.

3. The process of claim 2, wherein the natural magnesium silicate is chrysotile asbestos tailings.

4. The process of claim 3, wherein the chrysotile asbestos tailings are demagnetized.

5. The process of claim 2, wherein the reducing agent is carbon or carbon oxides.

6. The process of claim 2, wherein the reducing agent is ferrosilicon.

* * * * *